US008726290B2

(12) United States Patent
Dasdan

(10) Patent No.: US 8,726,290 B2
(45) Date of Patent: May 13, 2014

(54) SYSTEM AND/OR METHOD FOR BALANCING ALLOCATION OF DATA AMONG REDUCE PROCESSES BY REALLOCATION

(75) Inventor: Ali Dasdan, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1444 days.

(21) Appl. No.: 12/138,393

(22) Filed: Jun. 12, 2008

(65) Prior Publication Data

US 2009/0313635 A1     Dec. 17, 2009

(51) Int. Cl.
*G06F 9/46* (2006.01)
(52) U.S. Cl.
USPC .......................... 718/105; 718/100; 718/102
(58) Field of Classification Search
USPC ................... 718/100, 102, 104, 105
See application file for complete search history.

(56) References Cited

U.S. PATENT DOCUMENTS

| 7,243,001 | B2* | 7/2007 | Janert et al. ................ 700/214 |
| 7,412,353 | B2* | 8/2008 | Borkar et al. ............... 702/186 |
| 7,590,620 | B1* | 9/2009 | Pike et al. ........................ 1/1 |
| 7,650,331 | B1* | 1/2010 | Dean et al. ................... 712/203 |
| 7,712,100 | B2* | 5/2010 | Fellenstein et al. ......... 718/104 |
| 7,756,919 | B1* | 7/2010 | Dean et al. ................... 709/201 |
| 7,865,898 | B2* | 1/2011 | Vaidyanathan et al. ...... 718/105 |
| 2004/0177062 | A1* | 9/2004 | Urquhart et al. ................ 707/3 |
| 2004/0225638 | A1* | 11/2004 | Geiselhart et al. ............... 707/1 |
| 2005/0114414 | A1* | 5/2005 | Matsubara ....................... 708/1 |
| 2008/0086442 | A1* | 4/2008 | Dasdan et al. ................... 707/1 |
| 2008/0120314 | A1* | 5/2008 | Yang et al. ................... 707/101 |
| 2010/0005080 | A1* | 1/2010 | Pike et al. ....................... 707/4 |

OTHER PUBLICATIONS

Yang et al. "Reduce-Merge: Simplified Relational Data Processing on Large Clusters". Proceedings of the 2007 ACM SIGMOD international conference on Management of data, Jun. 12-14, 2007, pp. 1029-1040.*
Zomaya "Observations on Using Genetic Algorithms for Dynamic Load Balancing", IEEE Transactions on Parallel and Distributed Systems, Sep. 2001, pp. 899-911.*
Dean et al., "MapReduce: Simplified Data Processing on Large Clusters", Communications of the ACM, Jan. 2008, vol. 51, No. 1, pp. 107-113.

\* cited by examiner

*Primary Examiner* — Emerson Puente
*Assistant Examiner* — Willy W Huaracha
(74) *Attorney, Agent, or Firm* — Berkeley Law & Technology Group, LLP

(57) ABSTRACT

The subject matter disclosed herein relates to a system and/or method for allocating data among reduce processes. In a particular implementation, a map process may be executed to provide intermediate data associating key/value pairs with input data. Intermediate data may be allocated among a plurality of reduce processes. At least a portion of intermediate data initially allocated to one or more of said reduce processes may be re-allocated based, at least in part, on a load factor associated with one or more reduce processes.

21 Claims, 7 Drawing Sheets

SYSTEM AND/OR METHOD FOR BALANCING ALLOCATION OF DATA AMONG REDUCE PROCESSES BY REALLOCATION

BACKGROUND

1. Field

The subject matter disclosed herein relates to distribution of tasks in concurrent processing systems.

2. Information

MapReduce is a programming framework that may be implemented to perform parallel computations or other data transformations. The computations or data transformations may be distributed across a plurality of networked computing platforms under the management of an implementation of a framework such as a MapReduce framework. A "map" function may map input data to create intermediate key-value pairs. A "reduce" function may condense all mapped (intermediate) key-value pairs sharing the same key to a single key-value pair or a list of values. Users may provide a map function to be applied to the key-value pairs in the map process. Likewise, users may provide a reduce function to be applied in the reduce process to the new (intermediate) key-value pairs. Management of parallel processing by an implementation of a MapReduce function may reduce the need for users to manage parallel processing of their data.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
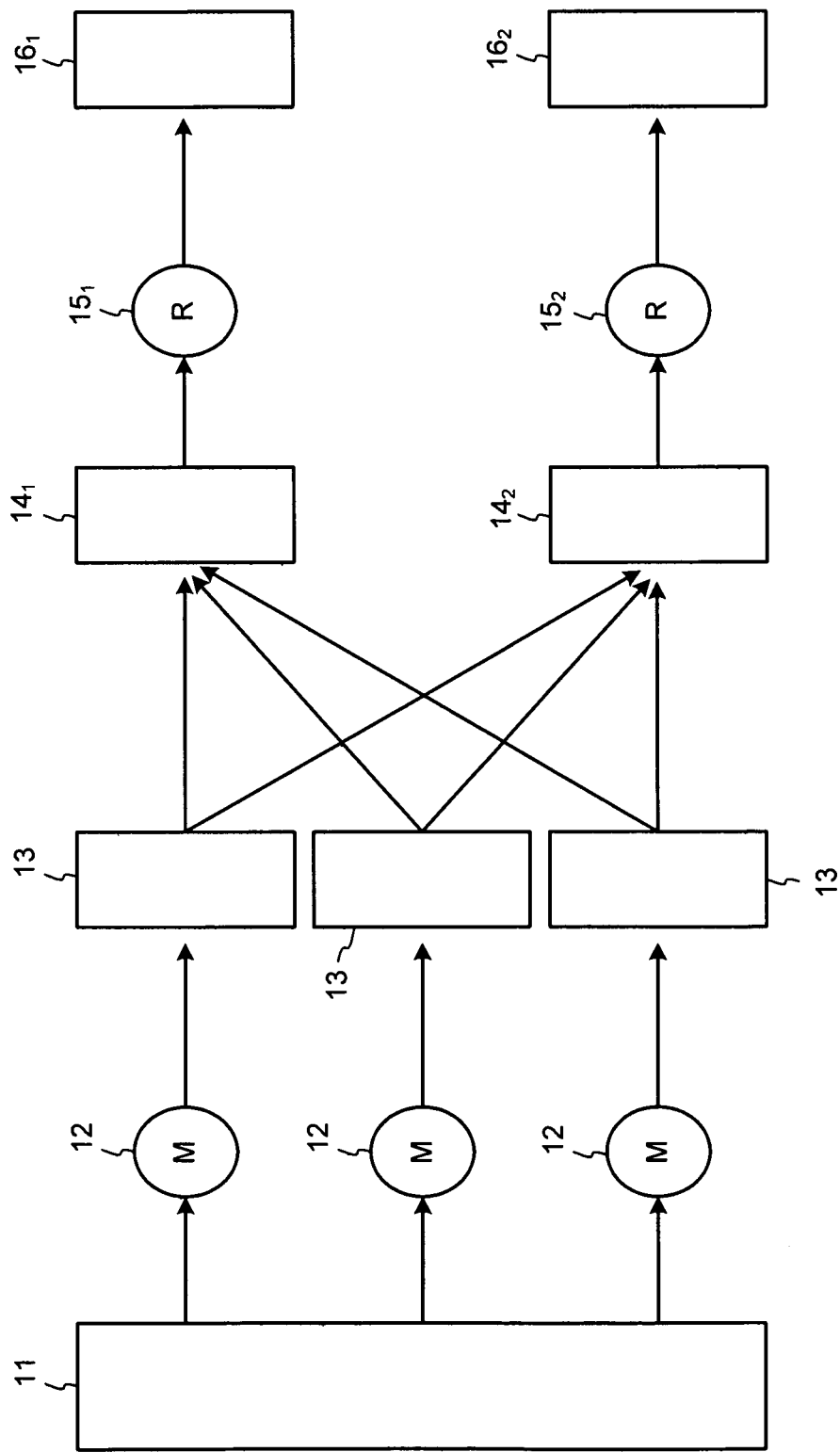
FIG. 1 is a schematic diagram of an instance of a MapReduce process according to an embodiment.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining", "allocating" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

Embodiments described herein relate to, among other things, distribution of tasks in a parallel and/or concurrent computing environment among computing platforms that are in communication with one another. Such computing platforms may be operated in parallel to complete a multi-stage task, such as a MapReduce task that includes one or more map processes and one or more reduce processes. Such a task may require communication between and/or among computing platforms. Such communication may occur via an electronic communication network to which the computing platforms may be connected.

More particularly, and in certain embodiments, a MapReduce framework may be implemented to provide parallel processing for a user's map and reduce processes on multiple computing platforms. In one particular implementation of a MapReduce framework, in defining an application, a user may define one or more map functions and one or more reduce functions. Such user-defined map functions may be carried out and/or executed by defined map processes and such user-defined reduce functions may be carried out and/or executed by defined reduce processes.

FIG. 1 shows an implementation of a multi-stage process such as a MapReduce process according to an embodiment. Input data 11 may be partitioned among multiple instances of a map process 12. In one embodiment, instances of the map process 12 may execute on separate computing platforms. For example, if the input data 11 is a text file, such a text file may be partitioned into three portions with one portion being assigned to each of three instances of map process 12.

In one embodiment, instances of a map process 12 may be assigned for execution to one of a plurality of computing platforms. FIG. 1 depicts three instances of map process 12. However, many more than three such instances of a map process may be execute simultaneously, and many more than three computing platforms may be operated in parallel to execute such map processes on input data 11. Map processes 12 may provide intermediate data 13 as output data. In one particular implementation, such intermediate data 13 may comprise a plurality of keys and values associated with one another in the form of, for example, key/value pairs.

Input data 11 may take any one of several forms. In one particular example, for the purpose of illustration, input data 11 may comprise a text file. Here, an object of the map and reduce functions may be to find a number of occurrences of certain words, such as "the" and "apple" in the text file. This text file may be partitioned into three portions, or partitions, and one partition may be assigned to each of three map processes 12 shown in FIG. 1, for example. Map processes 12 may take each line of text in their respective partitions and identify each distinct word that occurs in such line of text, and a number of times it occurs.

If such a map process 12 were to process a line containing two instances of the word "the," the map process might provide a key/value pair with "the" as a key and "2" as a value. For reference, such a key/value pair might be represented as {the, 2}. Likewise, if the same line contained one occurrence of "apple," a key/value pair might be output with "apple" as a key and 1 as a value. This might be represented as {apple, 1} for reference purposes. A map process 12 may continue until all words in such line have been rendered as key/value pairs, and until all lines of text in a partition have been processed and key/value pairs have been created. All key/value pairs so produced in map processes 12, taken together, constitute intermediate data 13. As illustrated below, portions of intermediate data 13 may be allocated among portions of intermediate data 14 to be processed by associated reduce processes 15.

Intermediate data 13 provided by a particular map process 12 may not be maintained in any particular order, and may be stored/saved by the associated map process 12 separately from intermediate data 13 provided by other map processes 12. Intermediate data 13 provided by one map process 12 may contain key/value pairs with keys that also appear in intermediate data 13 provided by other map processes 12. Continuing the foregoing example, it may be likely that lines of text in all partitions would include occurrences of common words such as "the." In order to prepare intermediate data 14 for a reduce process 15, a separate portion 14 of intermediate data may be created for each key, and all key/value pairs of intermediate data 13 from the output of any map process 12 may be stored in such a portion 14 of intermediate data. Collections of such portions of intermediate data 14 may be used as input data for reduce processes 15.

In particular embodiments, portions 14 of intermediate data may be of different sizes. In the foregoing example, and assuming a text having 10,000 lines, the word "the" may occur in 5,000 of such lines. A portion 14 associated with the word "the" as a key may then include 5,000 key/value pairs with "the" as a key. By contrast, "apple" may occur less frequently in the lines of text, for example five times. Here, accordingly, a portion 14 of intermediate data for the key "apple" might thus contain only five key/value pairs with "apple" as a key. In the end, according to an implementation of a MapReduce framework, a number of different portions 13 of intermediate data may equal a number of map processes 12, and the number of different portions 14 of intermediate data may equal a number of reduce processes 15.

In one implementation of a MapReduce process, portions 14 of intermediate data may be presented to reduce processes 15 for processing. Each such reduce process 15 may produce a series of key/value pairs of output data 16 that may then be combined or merged into a final output data set (not shown). Continuing the foregoing example, a user may provide a reduce process that takes key/value pairs in an associated portion 14 of intermediate data and sum values of each such key/value pair in the associated portion 14. A portion 14 having "the" as a key might contain 1,000 key/value pairs representing lines of text in which "the" appeared two times (e.g., {the, 2}) and 4,000 key/value pairs representing lines of text in which "the" appeared one time (e.g., {the, 1}). Thus, summing the values of all the key/value pairs in such partition would yield a result of 6,000. This may be represented in associated output data 16 as a key/value pair with "the" as a key and "6,000" as a value (e.g., {the, 6000}). Such key/value pair may indicate that "the" appears 6,000 times in the input data text of this example.

In the foregoing example, and with reduce processes $15_1$ and $15_2$ as shown in FIG. 1, portions 14 of intermediate data might be allocated among reduce processes 15. In this example, all intermediate data 13 containing key/value pairs with keys starting with letters "A" through "M" might be presented to one reduce process 15 in a portion 14 of intermediate data. Intermediate data 13 with key/value pairs having keys commencing with "N" through "Z" may then be assigned for processing to another reduce process 15 in a different portion 14 of intermediate data. A "load" on a particular reduce process 15 may depend on how many partitions of intermediate data 13 have keys that fall within the range specified for an associated portion 14 of intermediate data, and on how many key/value pairs are contained in such partitions.

Figure 2:
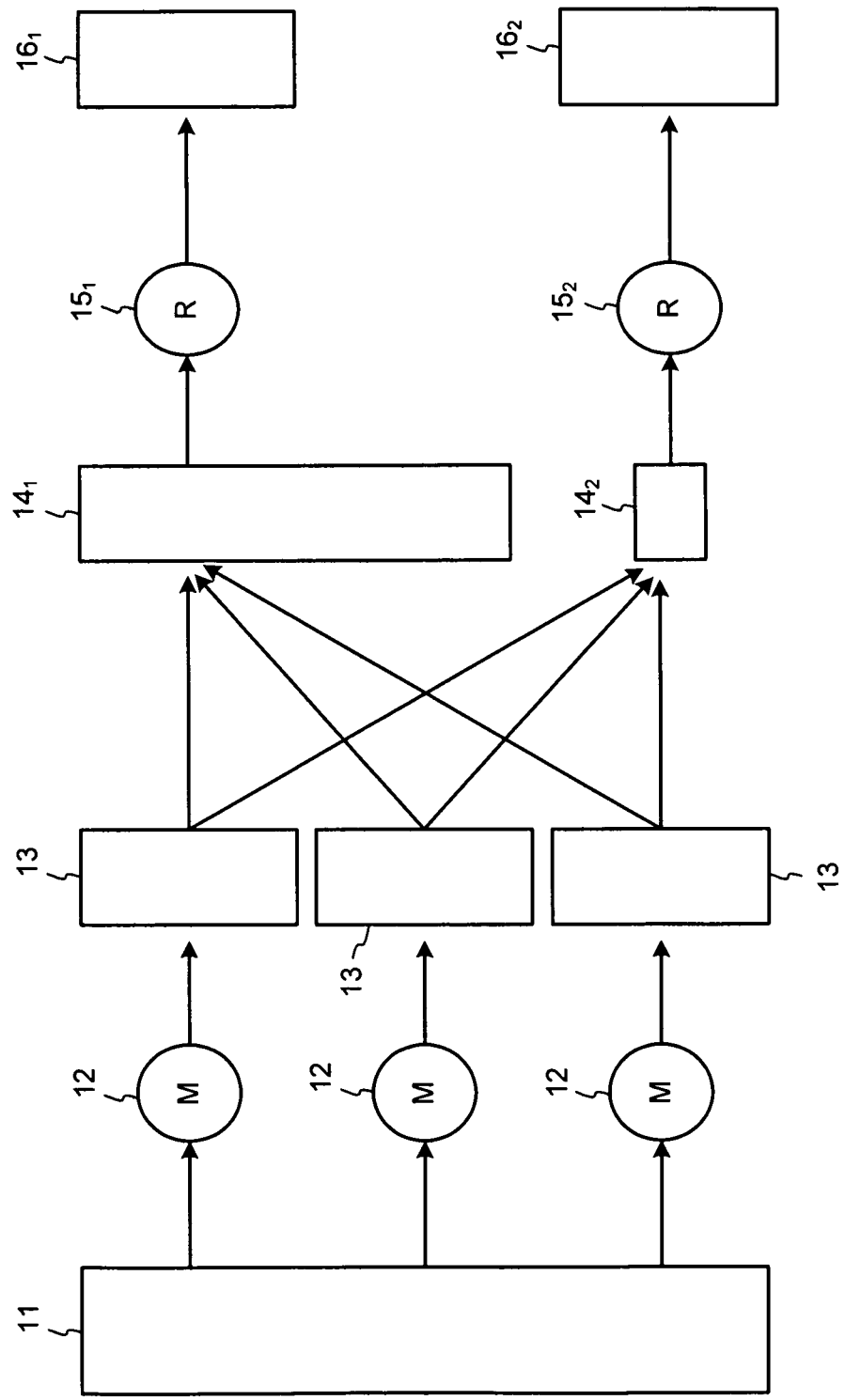
FIG. 2 is a schematic diagram of an instance of a MapReduce process showing an unbalanced load associated with at least one reduce process.

Of course, although only two reduce processes 15 are shown in FIG. 1, many more reduce processes 15 may be executed concurrently. If a large enough number of reduce processes 15 are concurrently executed, each partition of intermediate data 13 could be assigned to a different reduce process 15. In such case, in the present example, a portion 14 of intermediate data containing key/value pairs having "the" as a key might be assigned to one reduce process 15. A portion 14 intermediate data containing key/value pairs having "apple" as a key might be assigned to a different reduce process 15. In such case, a load on a reduce process 15 processing a portion 14 of intermediate data 14 in which key/value pairs have "the" as a key may be determined by a requirement to process 6,000 key/value pairs. By contrast, a load on a reduce process 15 processing a portion 14 of intermediate data in which key/value pairs have "apple" as a key may be determined by a requirement to only have four key/value pairs to process. Thus, a first one of these two reduce process 15 may have a high load relative to a second of such reduce processes 15. Accordingly, load imbalances may exist among reduce processes 15. For example, intermediate data may be allocated among reduce processes 15 such that a heavier load is placed on one reduce process 15 relative to others. Such an unbalanced load may be illustrated in FIG. 2. Here, portion $14_1$ of intermediate data such as key/value pairs (e.g., with "the" as a key as illustrated in the previous illustration), for example, to be processed by an associated reduce process $15_1$ is larger than portion $14_2$ of intermediate data such as key/value pairs (e.g., with "apple" as a key as illustrated in the previous illustration), for example, to be processed by an associated reduce process $15_2$, suggesting that reduce process $15_1$ may have a larger processing load. As such, a less heavily loaded reduce process $15_2$ may finish processing its associated portion $14_2$ of intermediate data before a more heavily loaded reduce process $15_1$ finishes processing of its associated portion $14_1$ of intermediate data.

In many cases, load imbalances may be significant. Portions 14 of intermediate data may differ in size by one or more orders of magnitude. Again, referring to the example above, for the "the" and "apple" cases, a ratio of the heavy load to the light load approaches 1,200. In such cases, completion times for heavily loaded reduce processes 15 may likewise differ from those of lightly loaded reduce processes by one or more orders of magnitude. As a MapReduce process may not be completed until all of the reduce processes 15 have completed, such load imbalances may delay completion of the overall MapReduce process.

Users may desire to balance loads across reduce processes 15, but this may be difficult for them or otherwise undesired. Firstly, for example, there may be insufficient knowledge about know how intermediate data set may be partitioned and/or distributed. Thus, at the outset of the process, there may not be sufficient information to determine how to distribute such intermediate data. Secondly, writing a computer program routine for managing distribution of a user's intermediate data among computing platforms in a determining how to distribute the data among computing platforms of a parallel processing system may be a difficult task for a user. Further, preparing such a computer program routine may require a higher level of knowledge about a parallel processing system than a user may have or than a user may wish to deal with.

Figure 3:
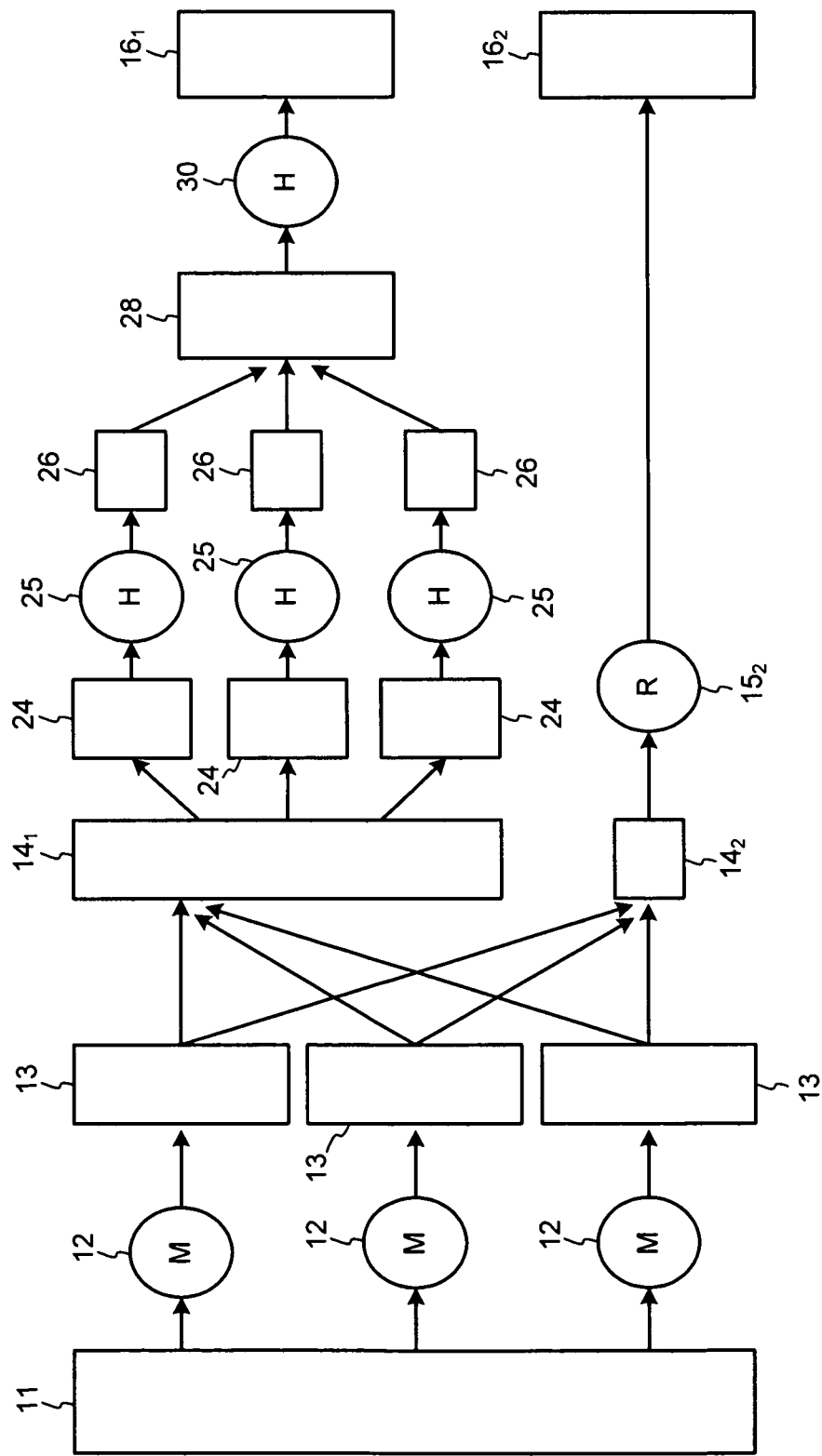
FIG. 3 is a schematic diagram of an instance of a MapReduce process adapted to reallocate a portion of intermediate data according to an embodiment.

According to a particular embodiment, although claimed subject matter is not limited in this respect, a portion of intermediate data allocated to a reduce process 15 may be re-allocated for processing based, at least in part, on a load factor associated with said reduce process 15. In a particular example, as illustrated in FIG. 3, a portion 14 of intermediate data allocated to a first reduce process (not shown) is partitioned into three partitions 24, each partition 24 being associated with a particular helper reduce process 25 for processing. Here, helper reduce processes 25 may process intermediate data in respective associated partitions 24 more quickly than a single reduce process 15 loaded with the task of processing an un-partitioned portion 14. Output data 26 from individual helper reducer processes may be merged to provide intermediate data 28, which may be processed by helper reduce process 30 to produce a final merged output $16_1$.

In one particular embodiment, a helper reduce process may execute a user-defined reduce function, which is the same function to be executed by reduce processes. Alternatively, a helper reduce process may execute a new function defined by the user or created by the MapReduce system specifically for helper reduce processes. Such a new function, called a helper reduce function for simplicity, may be different from a reduce function. In other words, a function executed by helper reduce processes may be the same as or different from the reduce function.

While balancing loads across multiple reduce processes may be desirable for certain implementations, such balancing may be difficult for a number of reasons. For example, it may be difficult to determine in sufficient detail about intermediate data produced by a map process to effectively predict loading impacts to reduce processes downstream (e.g., to determine how such intermediate data may be partitioned and/or allocated among reduce processes). Also, writing and implementing a computer program routine for managing distribution of intermediate data among computing platforms of a concurrent processing system may be a difficult task for a user.

Figure 4:
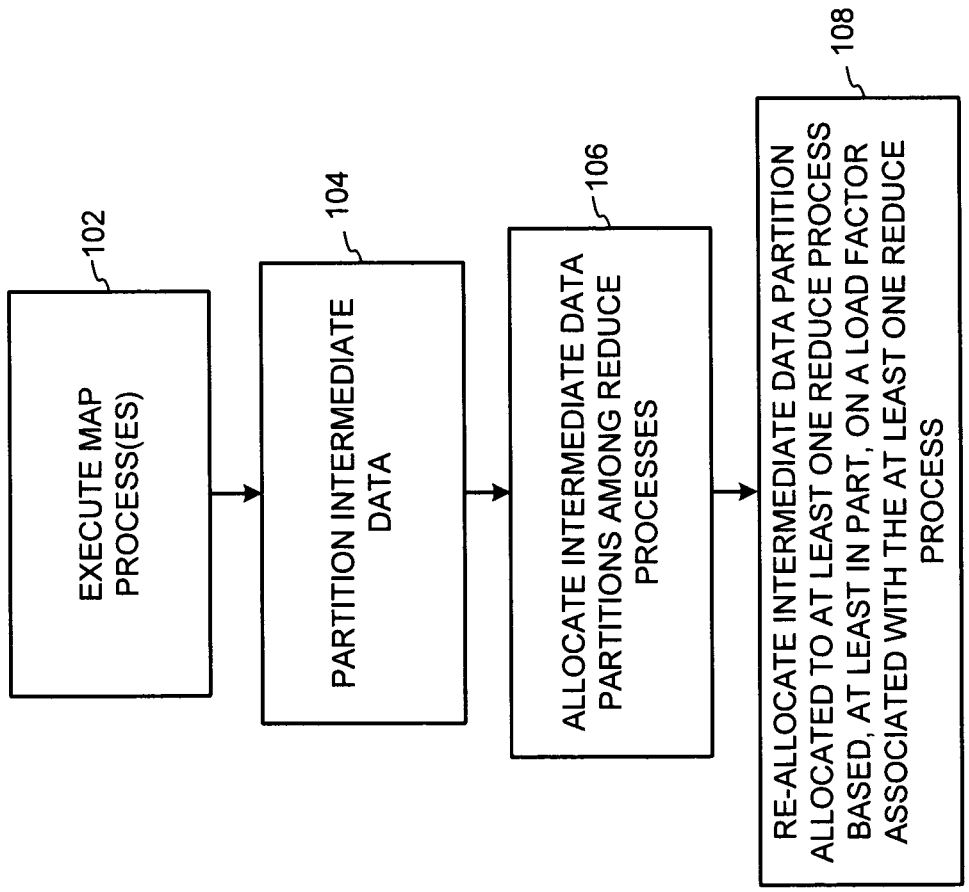
FIG. 4 is a flow diagram illustrating a process for reallocation of intermediate data initially allocated to a reduce process according to an embodiment.

As illustrated below with reference to FIG. 4, intermediate data initially allocated to a reduce process may be reallocated for processing elsewhere based, at least in part, on a load factor associated with the reduce process. In one particular implementation, process 100 is directed to controlling processing in a MapReduce process as described above. At block 102, input data may be processed at one or more map processes to provide intermediate data (e.g., associated with key-value pairs as discussed above). Block 104 may partition intermediate data provided execution of map processes among reduce processes for further processing.

As pointed out above, loads among multiple reduce processes for processing intermediate data may be unbalanced as a result of, for example, an unbalanced allocation of intermediate data among the multiple reduce processes. According to an embodiment, block 108 may re-allocate at least a portion of intermediate data allocated to a reduce process based, at least in part, on a load factor associated with the reduce process. Such a load factor may be descriptive of a load associated with a reduce process in connection with processing intermediate data allocated for processing. Such a load factor may be determined using any one of several techniques. For example, a load factor may be based on an estimated time for a reduce process to complete processing of a current allocation of intermediate data. In one embodiment, such an estimated completion time may be based, at least in part, on an estimated rate at which a reduce process may process of key/value pairs, together with a total number of key/value pairs in intermediate data initially allocated to the reduce process. For example, if a reduce process is capable of processing 1000 key/value pairs in 10 seconds and if the reduce process has been allocated 100,000 key/value pairs of intermediate data to process, an estimate of completion time of 1000 seconds might be made. In one embodiment, the processing rate may be determined from data collected from already completed reduce processes in a MapReduce process. It should be understood, however, that this is merely an example of a load factor according to a particular embodiment and that claimed subject matter is not limited in this respect.

Other factors that may be used as at least part of a basis for determining load factors may include, for example, a total number of key/value pairs allocated to a reduce process, a total number of bytes of intermediate data allocated to a reduce process for processing, the total number of keys and/or values allocated to a reduce process, etc. In one embodiment, these factors may be summarized in histograms over some or all of the reduce processes or some or all of the completed reduce processes. Such histograms can be used in determining load factors with varying degrees of statistical accuracy.

In particular embodiments, any one of several histograms may be used to track performance of reducer processes. Such histograms may maintain statistics for input data over finished and unfinished reducer processes individually and/or input or output data transfer statistics over all reducer processes. Such histograms may track statistics such as, for example, running time per byte, value or key, transfer time per byte, value or key. Other histograms may maintain statistics for output generation over finished reducers. Here, such histograms may track statistics such as, for example, input bytes per output bytes, number of values input per number of values output and/or number of input keys per number of output keys.

Histograms may be created and/or maintained for reducer processes that have finished or not finished processing a current allocation of intermediate data. In a particular embodiment, such histograms may be used to estimate running time for unfinished reducer processes. Such estimates may be used, for example, in resolving imbalances and determining whether to employ one or more helper reduce processes.

In determining whether a reduce process is heavily loaded, any one of several criteria may be applied to load factors. For example, a fixed maximum completion time may be set and any reduce process estimated to have a longer runtime may be designated as heavily loaded. In another example, an average load factor across all reduce processes of interest may be calculated, and reduce processes having a load factor exceeding an average load factor by an amount or percentage may be determined to be heavily loaded. Here, a histogram is created by a MapReduce system, then the standard deviation and the mean from the histogram may be calculated and thresholds for detecting heavy loads may be set to the values that are a constant multiple of the standard deviation away from the mean. For example, two thresholds may correspond to the values that are three standard deviations away from the mean. However, these are merely examples of methods for determining whether a reduce process is heavily loaded according to particular embodiments for the purpose of illustration, and claimed subject matter is not limited in this respect.

In one particular implementation, a load factor may be used in determining and/or quantifying additional processing resources for processing intermediate data. For example, a reduce process may be determined to be heavily loaded based on an estimated or calculated completion time that exceeds a maximum completion time, as mentioned above. A load factor associated with such a reduce process may be used to determine a number of helper reduce processes to receive a re-allocation of intermediate data initially allocated to the reduce process. Such a number of helper reduce processes may be determined to be sufficient to complete processing of such re-allocated intermediate data by expiration of a maximum allowed completion time, for example. Thus, a determination may be made as to an amount of intermediate data to be allocated to such helper reduce processes. As pointed out above, all or a portion of intermediate data allocated to a reduce process for processing may be reallocated to one or more helper reduce processes.

As pointed out above, all or a portion of intermediate data allocated to a reduce process may be reallocated. In a particular implementation, a load factor may be used to determine an amount of intermediate data initially allocated to a reduce process is to be reallocated. For example, as mentioned above, a maximum completion time may be used as a criterion in identifying a heavily loaded reduce process. If, for example, a completion time of 1000 seconds has been calculated and/or estimated, such value may be used as a load factor. If a maximum completion time of 500 seconds has been set, at least half of the intermediate data may be reallocated to one or more helper reduce processes in order to complete processing of the intermediate data within the maximum time. Of course, time spent reallocating intermediate data 13 to helper reduce processes may be taken into account. A number of helper reduce processes needed may thus be determined based, at least in part, on an amount of intermediate data to be reallocated.

Figure 5:
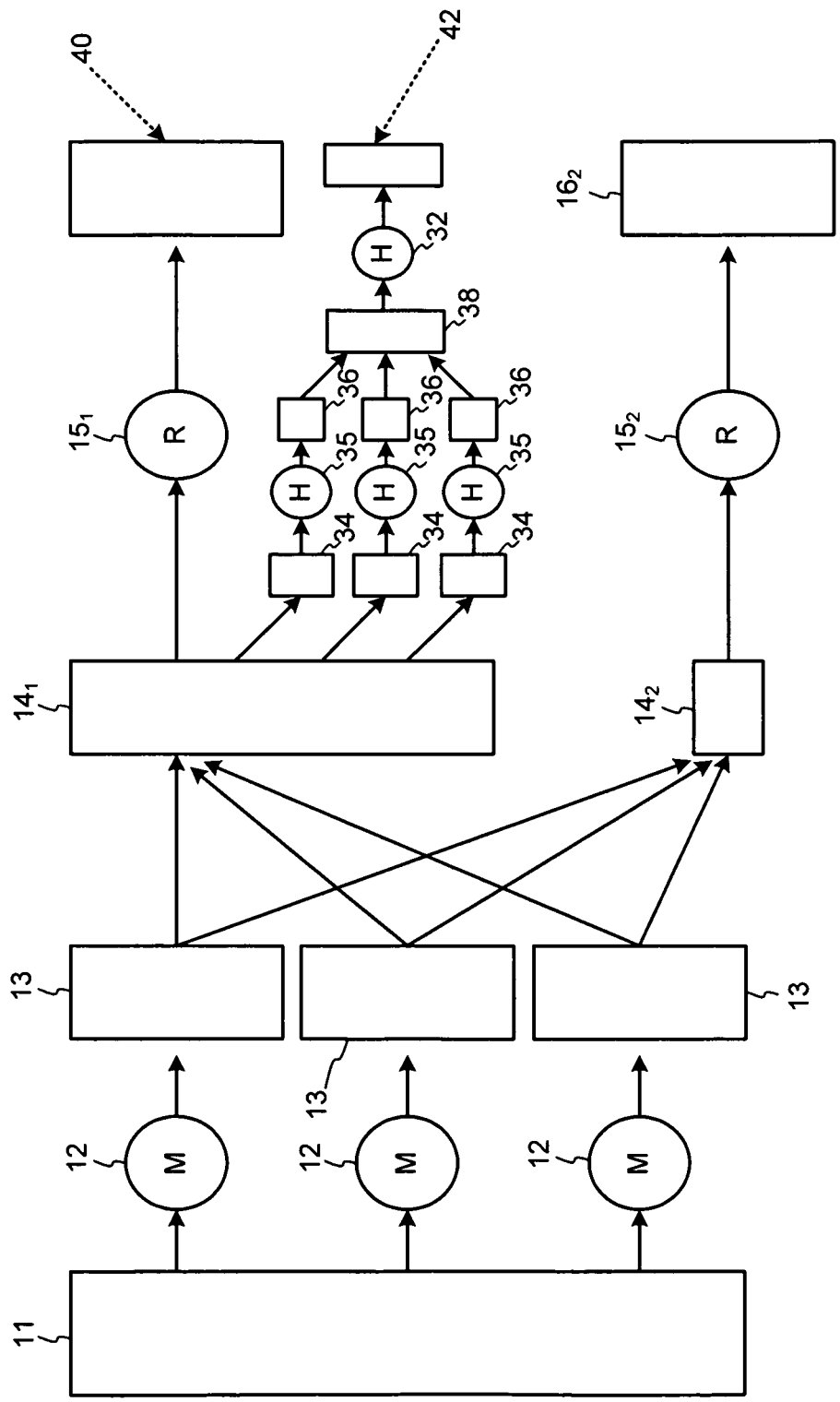
FIG. 5 is a schematic diagram of an instance of a MapReduce process adapted to reallocate a portion of intermediate data according to an alternative embodiment.
Figure 6:
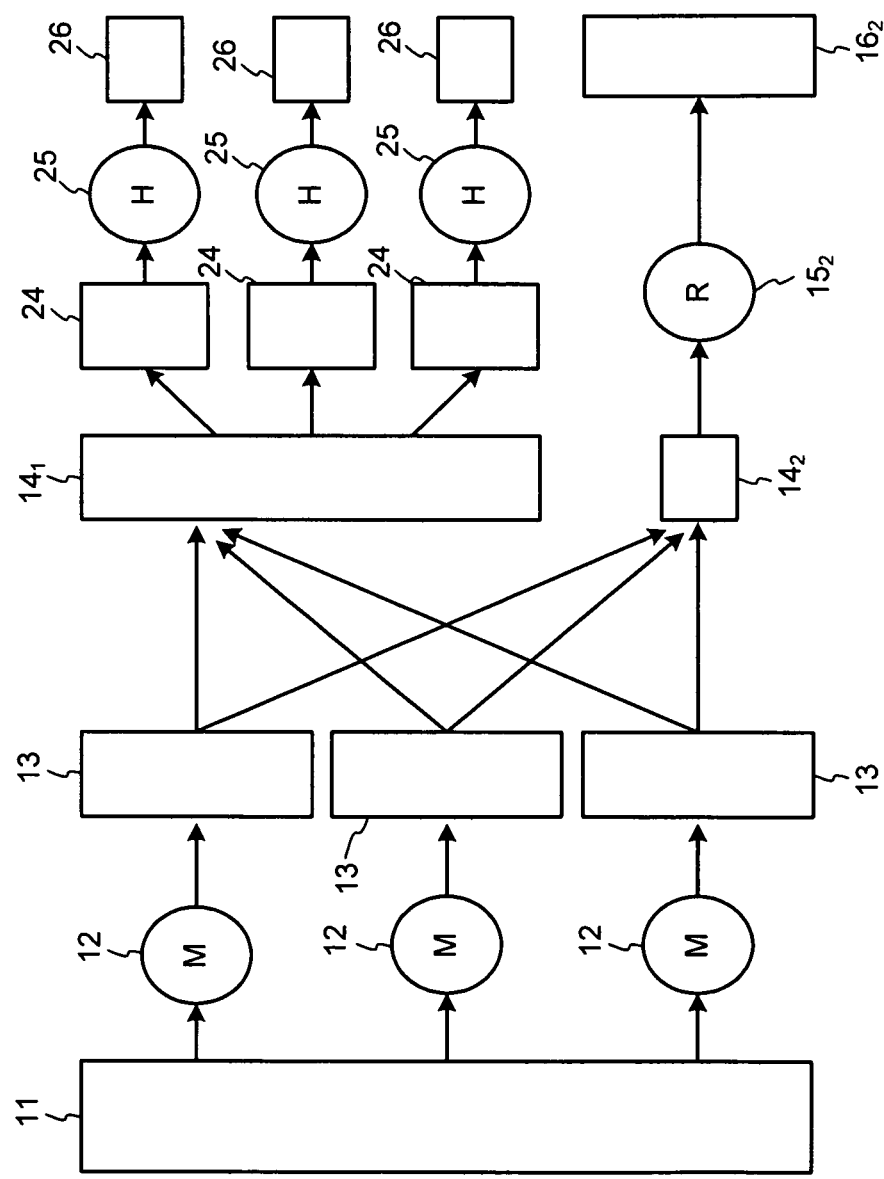
FIG. 6 is a schematic diagram of an instance of a MapReduce process adapted to reallocate a portion of intermediate data according to an alternative embodiment.

FIG. 3 illustrates a process in which intermediate data initially allocated to a reduce process is reallocated to one or more helper reduce processes. FIG. 5 is a schematic diagram of an alternative implementation in which only a portion of intermediate data initially allocated to a reduce process is reallocated to one or more helper reduce processes. Here, a portion of intermediate data $14_1$ initially allocated to reduce process $15_1$ is reallocated among helper reduce processes 35 in associated portions 34. However, a portion of intermediate data $14_1$ remains allocated to reduce process $15_1$ for processing. As a result, output data 40 and 42 may be interchangeable. If there are a sufficient number of processing elements, keeping reduce processes executing instead of idle may also be useful since whichever output data is created first may be taken as final output data (output data from other reduce processes may then be discarded). If there are not such a sufficient number of processing elements, this technique may not be effective, and the system of FIG. 5 may reduce to the system of FIG. 3, for example. In another alternative embodiment shown in FIG. 6, output data 26 provided by respective helper reducer processes 25 need not be merged (as illustrated in the embodiment of FIG. 3). This may also be accomplished as selected by a user, for example. Alternatively, however, a user may choose to have such output data merged.

Figure 7:
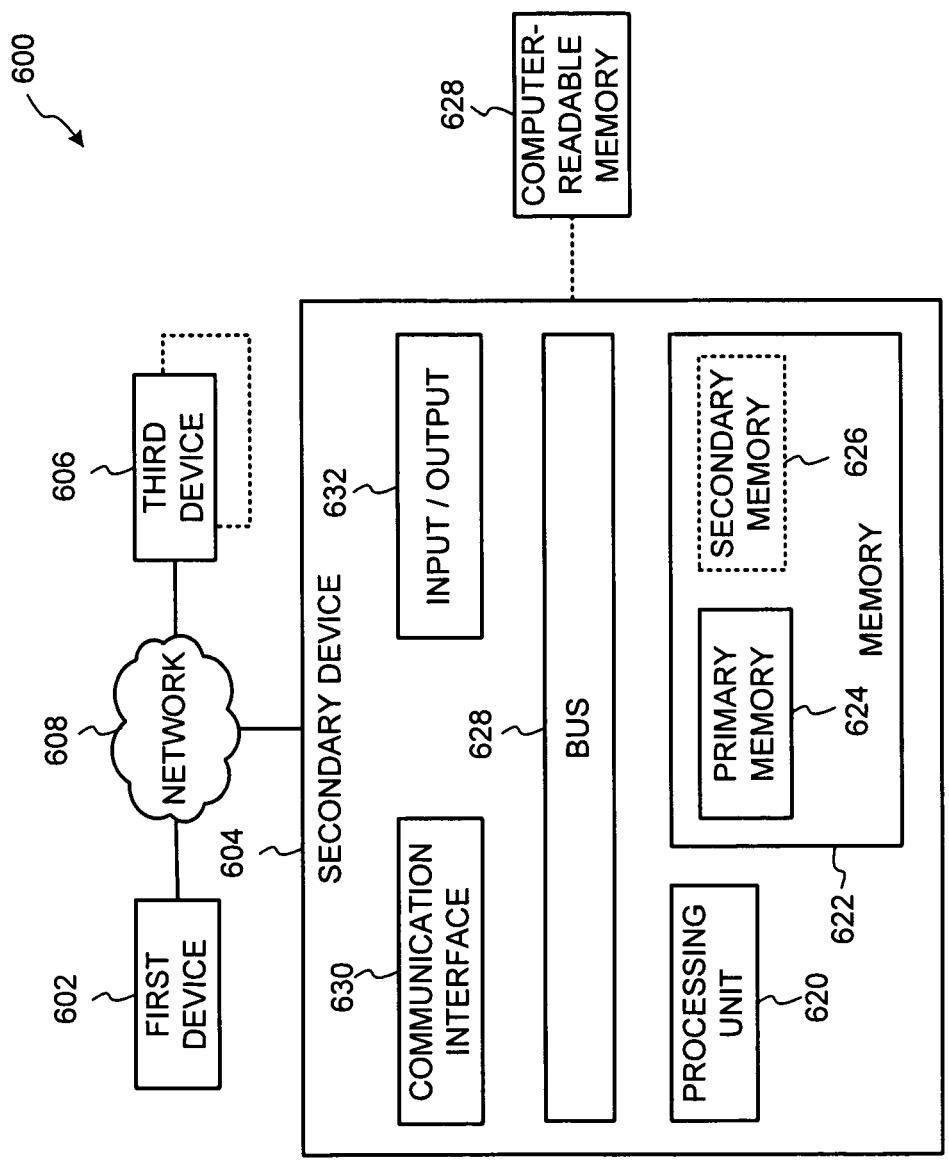
FIG. 7 is a schematic diagram of a computing environment adapted to host a MapReduce process according to an embodiment.

FIG. 7 is a schematic diagram illustrating an exemplary embodiment of a computing environment system 600 that may include one or more devices configurable to execute all or a portion of a MapReduce process using one or more techniques illustrated above, for example. In a particular example, although claimed subject matter is not limited in this respect, such a MapReduce process may be implemented to process queries that are received from devices coupled to network 608. System 600 may include, for example, a first device 602, a second device 604 and a third device 606, which may be operatively coupled together through a network 608.

First device 602, second device 604 and third device 606, as shown in FIG. 7, may be representative of any device, appliance or machine that may be configurable to exchange data over network 608. By way of example but not limitation, any of first device 602, second device 604, or third device 606 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 608, as shown in FIG. 7, is representative of one or more communication links, processes, and/or resources configurable to support the exchange of data between at least two of first device 602, second device 604, and third device 606. By way of example but not limitation, network 608 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 606, there may be additional like devices operatively coupled to network 608.

It is recognized that all or part of the various devices and networks shown in system 600, and the processes and methods as further described herein, may be implemented using or otherwise include hardware, firmware, software, or any combination thereof.

Thus, by way of example but not limitation, second device 604 may include at least one processing unit 620 that is operatively coupled to a memory 622 through a bus 628.

Processing unit 620 is representative of one or more circuits configurable to perform at least a portion of a data computing procedure or process. By way of example but not limitation, processing unit 620 may include one or more processors, controllers, microprocessors, microcontrollers, application specific integrated circuits, digital signal processors, programmable logic devices, field programmable gate arrays, and the like, or any combination thereof.

Memory 622 is representative of any data storage mechanism. Memory 622 may include, for example, a primary memory 624 and/or a secondary memory 626. Primary memory 624 may include, for example, a random access memory, read only memory, etc. While illustrated in this example as being separate from processing unit 620, it should be understood that all or part of primary memory 624 may be provided within or otherwise co-located/coupled with processing unit 620.

Secondary memory 626 may include, for example, the same or similar type of memory as primary memory and/or one or more data storage devices or systems, such as, for example, a disk drive, an optical disc drive, a tape drive, a solid state memory drive, etc. In certain implementations, secondary memory 626 may be operatively receptive of, or otherwise configurable to couple to, a computer-readable medium 628. Computer-readable medium 628 may include, for example, any medium that can carry and/or make accessible data, code and/or instructions for one or more of the devices in system 600.

Second device 604 may include, for example, a communication interface 630 that provides for or otherwise supports the operative coupling of second device 604 to at least network 608. By way of example but not limitation, communication interface 630 may include a network interface device or card, a modem, a router, a switch, a transceiver, and the like.

Second device 604 may include, for example, an input/output 632. Input/output 632 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 632 may include an operatively configured display, speaker, keyboard, mouse, trackball, touch screen, data port, etc.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

While there have been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
executing a map process via a computing platform to provide first intermediate data associating key/value pairs with input data;
allocating said first intermediate data among a plurality of reduce processes, said first intermediate data comprising a first portion and at least a second portion;
re-allocating said at least a second portion of said first intermediate data initially allocated to one or more of said reduce processes based, at least in part, on a load factor associated with said one or more reduce processes, wherein said re-allocating is performed prior to performing said plurality of reduce processes on said at least a portion of said first intermediate data; and
executing said reduce processes on said first portion and said at least a second portion of said first intermediate data, wherein in response to said re-allocating, at least a first helper reduce process is executed on said at least a second portion to generate second intermediate data and at least a second helper reduce process is performed on said second intermediate data.

2. The method of claim 1, and further comprising determining said load factor based, at least in part, on an estimated time of completion of processing of said portion by said plurality of reduce processes.

3. The method of claim 2, and further comprising determining said estimated time of completion based, at least in part, on one or more histograms of behavior associated with said at least one of said plurality of reduce processes.

4. The method of claim 3, wherein at least one of said one or more histograms represents run time per byte.

5. The method of claim 3, wherein at least one of said one or more histograms represents run time per value of key/value pairs.

6. The method of claim 3, wherein at least one of said one or more histograms represents run time per key of key/value pairs.

7. The method of claim 3, wherein at least one of said one or more histograms represents transfer time per byte.

8. The method of claim 3, wherein at least one of said one or more histograms represents transfer time per value of key/value pairs.

9. The method of claim 3, wherein at least one of said one or more histograms represents transfer time per key of key/value pairs.

10. The method of claim 1, wherein said allocating said first intermediate data among said plurality of said reduce processes comprises allocating said first intermediate data based, at least in part, on said key/value pairs.

11. The method of claim 1, wherein said first or second helper reduce processes execute a function defined by a user as a reduce function.

12. The method of claim 1, wherein said first or second helper reduce processes execute a function defined by a user as a helper reduce function.

13. The method of claim 1, wherein said first or second helper reduce processes execute a function defined by a MapReduce system as a helper reduce function.

14. The method of claim 1, and further comprising: merging output data provided by said second helper reduce process from processing said allocated portion.

15. The method of claim 1, and further comprising not merging output data provided by said second helper reduce process from processing said allocated portion based upon a user selection.

16. The method of claim 1, wherein said load factor is based, at least in part, on key-value pairs associated with said portion of first intermediate data.

17. An article comprising:
a non-transitory storage medium having machine-readable instructions stored thereon which are executable by a computing platform to:
initiate execution of a map process to provide first intermediate data associating key/value pairs with input data;
allocate said first intermediate data among a plurality of reduce processes, said first intermediate data comprising a first portion and at least a second portion;
re-allocate said at least a second portion of said first intermediate data initially allocated to one or more of said reduce processes based, at least in part, on a load factor associated with said one or more of said reduce processes, wherein said re-allocation is performed prior to performing said plurality of reduce processes on said at least a portion of said first intermediate data; and
executing said reduce processes on said first portion and said at least a second portion of said first intermediate data, wherein in response to said re-allocating, at least a first helper reduce process is executed on said at least a second portion to generate second intermediate data and at least a second helper reduce process is performed on said second intermediate data.

18. The article of claim 17, wherein said instructions are further executable by said computing platform to determine said load factor based, at least in part, on an estimated time of completion of processing of said portion by at least one of said plurality of reduce processes.

19. An apparatus comprising:
a computing platform to:
initiate execution of a map process to provide first intermediate data associating key/value pairs with input data;
allocate said first intermediate data among a plurality of reduce processes, said first intermediate data comprising a first portion and at least a second portion;
re-allocate said at least a second portion of said first intermediate data initially allocated to at least one of said reduce processes based, at least in part, on a load factor associated with said at least one reduce process, wherein said re-allocation is performed prior to performing said plurality of reduce processes on said at least a portion of said first intermediate data; and
initiate execution of said reduce processes on said first portion and said at least a second portion of said first intermediate data, wherein in response to said re-allocating, at least a first helper reduce process is executed on said at least a second portion to generate second intermediate data and at least a second helper reduce process is performed on said second intermediate data.

20. The apparatus of claim 19, said computing platform to determine said load factor based, at least in part, on an estimated time of completion of processing of said portion by at least one of said plurality of reduce processes.

21. The apparatus of claim 20, said computing platform to determine said estimated time of completion based, at least in part, on one or more histograms of behavior associated with said at least plurality of one or more reduce processes.

\* \* \* \* \*